United States Patent [19]

Ito

[11] Patent Number: 4,844,599

[45] Date of Patent: Jul. 4, 1989

[54] COMPACT AND HIGH-SPEED WIDE-ANGLE ZOOM LENS SYSTEM

[75] Inventor: Takayuki Ito, Tokyo, Japan

[73] Assignee: Asahi Kogaku Kogyo Kabushiki Kaisha, Japan

[21] Appl. No.: 160,045

[22] Filed: Feb. 24, 1988

[30] Foreign Application Priority Data

Feb. 27, 1987 [JP] Japan ................................ 62-44895

[51] Int. Cl.$^4$ ...................... G02B 15/177; G02B 9/64
[52] U.S. Cl. .................................... 350/426; 350/450
[58] Field of Search ................................ 350/426, 450

[56] References Cited

U.S. PATENT DOCUMENTS 4,726,665  2/1988  Itoh .................................... 350/426

Primary Examiner—Bruce Y. Arnold
Assistant Examiner—Rebecca D. Gass
Attorney, Agent, or Firm—Sughrue, Mion, Zinn, Macpeak & Seas

[57] ABSTRACT

A wide angle zoom lens system having a high level of brightness includes a zooming subsystem comprising first and second movable lens units and a fixed third lens unit. The first lens unit has at least one aspherical lens surface. In the preferred embodiment, a diaphragm is disposed between the second and third lens units and is displaced independently of the second lens group when zooming.

13 Claims, 16 Drawing Sheets

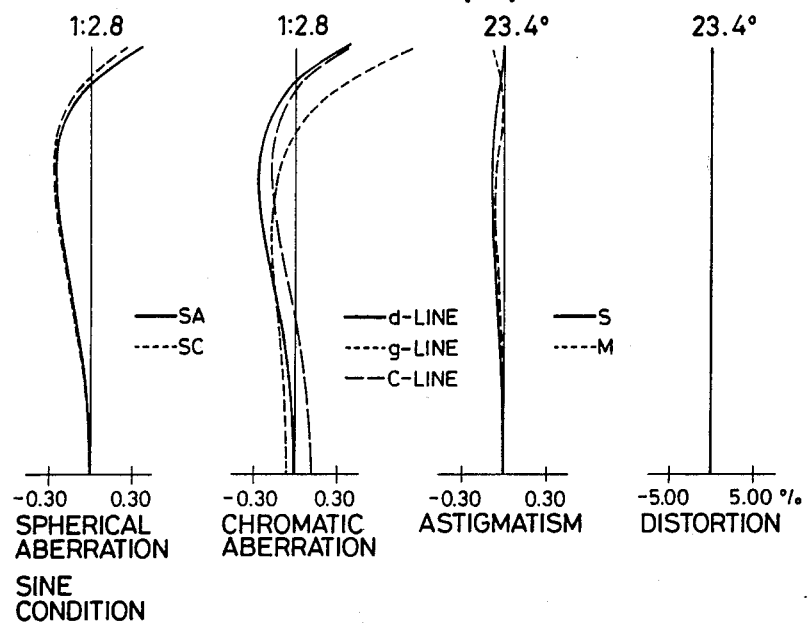
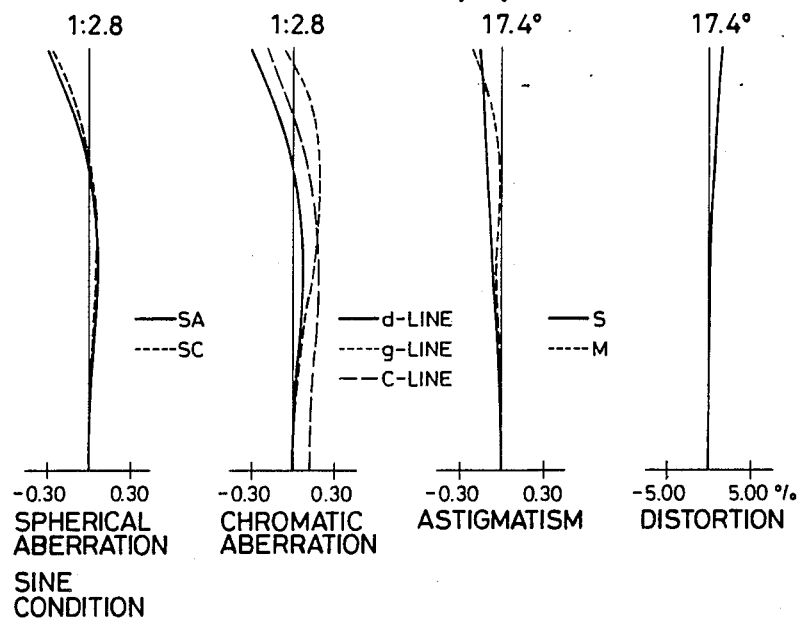

COMPACT AND HIGH-SPEED WIDE-ANGLE ZOOM LENS SYSTEM

BACKGROUND OF THE INVENTION

The present invention relates to a zoom lens system for a still camera. More particularly, the present invention relates to a zoom lens system that attains a zoom ratio of about 2 by covering a half view angle ranging from about 32° at the wide angle end to about 17° at the semi-telephoto end and which is very compact despite its capability for attaining a brightness (i.e., large effective aperture) at $F_{NO}$ of 1:2.8 or in the range of $F_{NO}$ 1:2.8 to 1:3.5.

Zoom lens systems that attain a zoom ratio of about 2 by covering half view angles ranging from wide angle to semi-telephoto and which feature aperature ratios in the range of 1:3.5 to 1:4.5 are classified either as a two-group type which consists of a negative first lens group and a positive second lens group as disclosed in Japanese Patent Application (OPI) Nos. 64811/1984 and 142515/1984 (the term OPI as used herein means an unexamined published Japanese patent application) or as a third-group fixed type which includes a fixed negative third lens group additionally disposed behind the combination of the negative first lens group and the positive second lens group as shown in Japanese OPI Nos. 97016/1983, 111013/1983 and 240217/1986. Zoom lens systems that feature an aperture ratio on the order of 1:2.8 while attaining a zoom ratio of about 2 are shown in Japanese OPI Nos. 83543/1986 and 9550/1980 and they all relate to the two-group type.

Problems with the prior art zoom lens system featuring $F_{NO}$ of 1:3.5 to 1:4.5 will now be described. Japanese OPI No. 64811/1984 shows that the overall length of a lens system can be reduced by providing an aspherical surface in a first lens group which is composed of two lens elements. However, the power of the first lens group is so small that it has to be displaced by a large amount during zooming and the overall length of the lens system is by no means short at the wide-angle end. In addition, the focusing lens has to be advanced by too large an amount to make the closest focusing distance short enough.

The zoom lens system shown in Japanese OPI No. 142515/1984 has a larger overall length than the system disclosed in Japanese OPI No. 64811/1984 because of the absence of any aspherical lens surfaces. Generally speaking, a zoom lens system of the two-group type does not allow the second lens group having a diaphragm stop to be moved by a smaller amount than in a lens system of the third-group fixed type having the same overall length (as will be discussed later in this specification).

The zoom lens system of the third-group fixed type which is a rather recent version is essentially the same as the zoom lens system of the two-group type except that it additionally includes a rear converter. The system shown in Japanese OPI No. 97016/1983 has the advantage of experiencing a small distortion. On the other hand, probably because of its intended application as a lens system for medium-format (6×4.5 cm or 6×7 cm) camera, this lens system has the disadvantage that it has a large overall length and requires many lens elements (especially in the first and third lens groups). The system shown in Japanese OPI No. 111013/1983 has the advantage of small size but, on the other hand, the negative powers of the first and third lens groups are so great that substantial variations will occur in spherical aberration and astigmatism during zooming. Furthermore, the excessive power of the first lens group causes the disadvantage that the second lens group has to be displaced by a large amount in spite of the use of the third lens group.

A zoom lens system that employs a negative third lens group which is not fixed but movable toward the object side together with the second lens group is proposed in many prior applications such as Japanese OPI Nos. 26754/1979 and 59157/1979. However, as compared with the third-group fixed type, this system has the disadvantage that the second lens group having a diaphragm stop has to be displaced by a large amount and that the overall length of the system is by no means small.

With a view to solving these problems, the assignee of the present invention filed Japanese OPI No. 240217/1986 and proposed a zoom lens system having a shorter overall length than any of the prior art products. However, there still remains room for improvement of this system because its large F number is not well-suited to an obvious requirement for a bright and compact system Problems with the prior art lens systems featuring $F_{NO}$ on the order of 1:2.8 will now be discussed.

The zoom lens system shown in Japanese OPI No. 83543/1986 is very simple for an aperture ratio of 1:2.8, since it is composed of 7 elements in 7 units. However, it suffers the disadvantage of large overall length. The system proposed in Japanese OPI No. 9550/1980 is also unsatisfactory in that it is capable of attaining a zoom ratio of less than 1.6 and that its overall length is by no means small. Each of these systems is of the two-group type and no system has been available in the art that is of the third-group fixed type and which features an aperture ratio on the order of 1:2.8. This is probably because, with a lens system as bright as one having an $F_{NO}$ of 1:2.8, effective aberrational compensation cannot be attained if comatic flare is increased by using a third lens group having a magnification greater than unity.

SUMMARY OF THE INVENTION

It is therefore an object of the present invention to provide a zoom lens system that ensures good performance in spite of having an F-number $F_{NO}$ of 1:2.8, or on the order of 1:2.8 to 1:3.5. The present invention attains this object by using a zoom lens system of the third-group fixed type which has conventionally been considered to be unsuitable for the purpose of achieving a high level of brightness and by exploiting the two notable features of this type of lense, i.e., that the overall lens length and the amount of movement of the first and second lens groups (in particular, the second lens group having a diaphragm stop) can be reduced.

The compact and high-speed wide-angle zoom lens system of the present invention comprises a sub-system responsible for zooming that is composed, in order from the object side, of a first lens unit having a negative focal length and a second lens unit having a positive focal length, and a fixed third lens unit (a relay lens sub-system) that is subsequent to the zooming sub-system and which extends the focal length thereof. The first lens unit has a negative and positive lens arrangement, and the second lens unit has a positive, negative and positive lens arrangement. This lens system is capable of changing the focal length while maintaining a constant focal position by mechanically moving the first and second lens units. The improvement of this zoom lens system is such that the first lens unit has at least one aspherical surface and is of a three-unit-three-element composition consisting, in order from the object side, of a negative meniscus lens element having a concave surface of large curvature on the image side, a negative lens element, and a positive lens element having a convex surface of large curvature on the object side, and that the second lens unit has a four-unit-four-element composition consisting, in order from the object side, of two positive lens elements each having a conex surface of large curvature on the object side, a negative lens element having a surface of concave curvature on the image side, and a positive lens element having a convex surface of large curvature on the image side. A further improvement on this lens system is that it satisfies the following conditions:

$$0.5 < \frac{f_2}{|f_1|} < 0.63 \quad (1)$$

$$0.9 < \frac{|f_1|}{f_L} < 1.2 \quad (2)$$

$$1.0 < m_3 < 1.2 \quad (3)$$

$$1.7 < \overline{N_{1n}} \quad (4)$$

$$1.7 < \overline{N_{2p}} \quad (5)$$

where,
$f_1$ is the focal length of the first lens unit;
$f_2$ is the focal length of the second lens unit;
$f_L$ is the focal length of the overall system at the narrow-angle end;
$m_3$ is magnification by the third lens unit;
$\overline{N_{1n}}$ is the average of the refractive indices at the d-line of the two negative lens elements in the first lens unit; and
$\overline{N_{2p}}$ is the average of the refractive indices at the d-line of the two positive lens elements in the second lens unit on its object side.

In a preferred embodiment, the third lens unit is simply composed of a single negative lens element or consists of a cemented negative lens of a mere one-unit-two-element composition wherein a positive lens element is cemented to a negative lens element, or is in the form of a negative lens unit having a two-unit-two-element composition consisting of a positive and a negative lens element.

In another preferred embodiment, a fixed diaphragm stop is disposed between the second and third lens units in such a way that said diaphragm stop is displaced independently of the second lens unit by a smaller amount than said second lens unit when zooming is effected from the wide-angle end to the narrow-angle end.

BRIEF DESCRIPTION OF THE DRAWINGS

FIGS. 2(b), 4(b), 6(b), 8(b), 10(b), 12(b), 14(b) and 16(b) are graphs plotting the aberrational curves obtained with the lens systems of Examples 1 to 8, respectively, at the middle-angle end; and FIGS. 2(c), 4(c), 6(c), 8(c), 10(c), 12(c), 14(c) and 16(c) are graphs plotting the aberrational curves obtained with the lens systems of Examples 1 to 8, respectively, at the narrow-angle end.

DETAILED DESCRIPTION OF THE INVENTION

Figure 1:
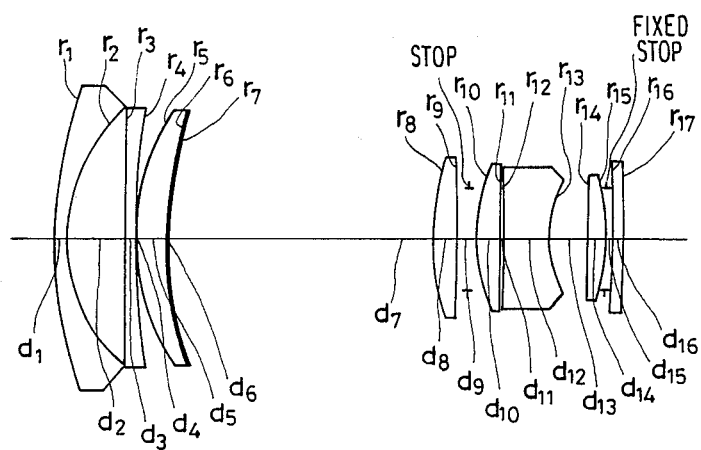
FIGS. 1, 3, 5, 7, 9, 11, 13 and 15 are simplified cross-sectional views of the lens systems constructed according to Examples 1 to 8, respectively, of the present invention.
Figure 2A:
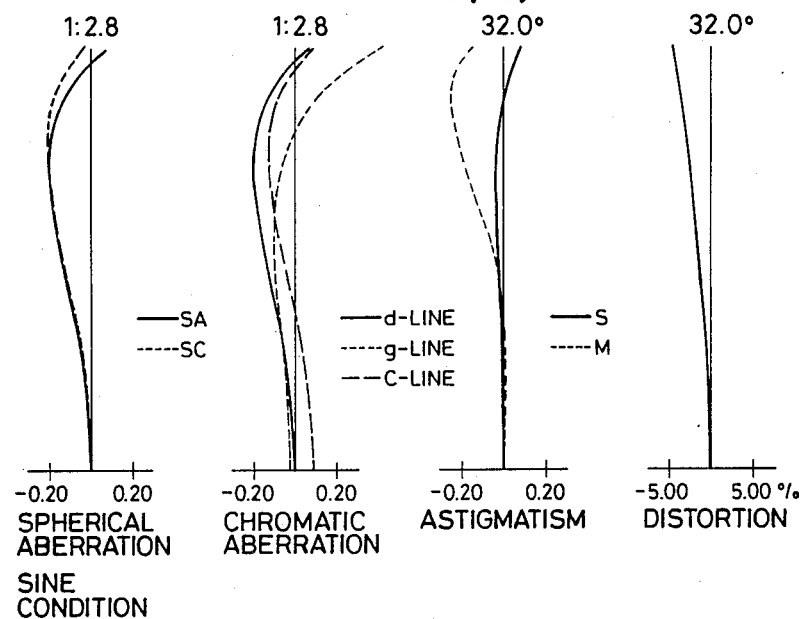
FIGS. 2(a), 4(a), 6(a), 8(a), 10(a), 12(a), 14(a) and 16(a) are graphs plotting the aberrational curves obtained with the lens systems of Examples 1 to 8, respectively, at the wide-angle end.
Figure 2B:
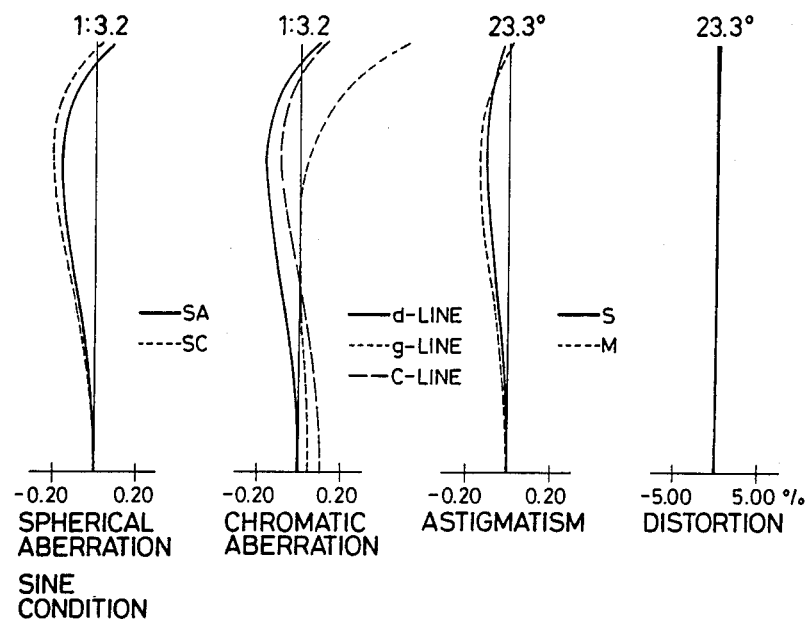
Figure 2C:
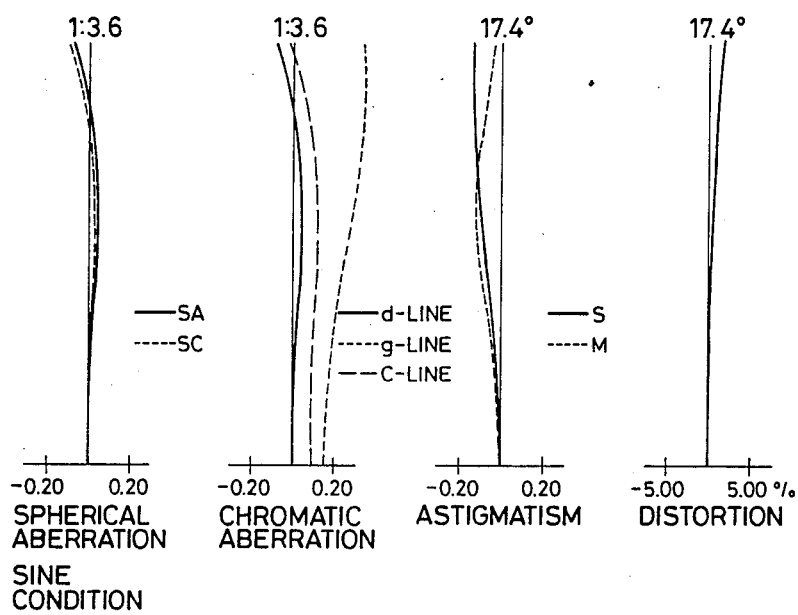
Figure 3:
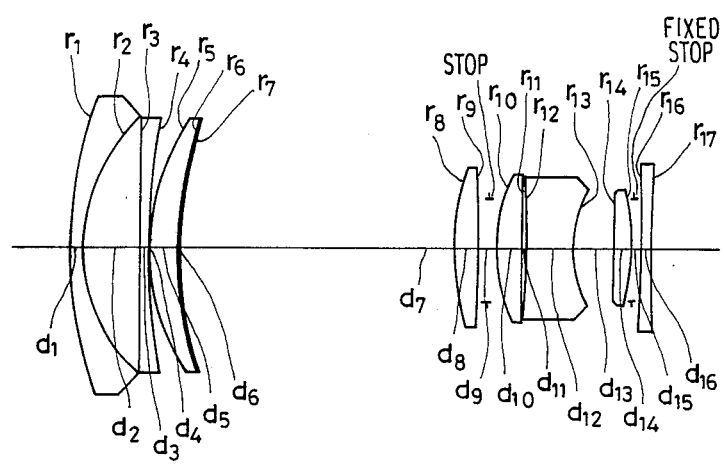
Figure 4A:
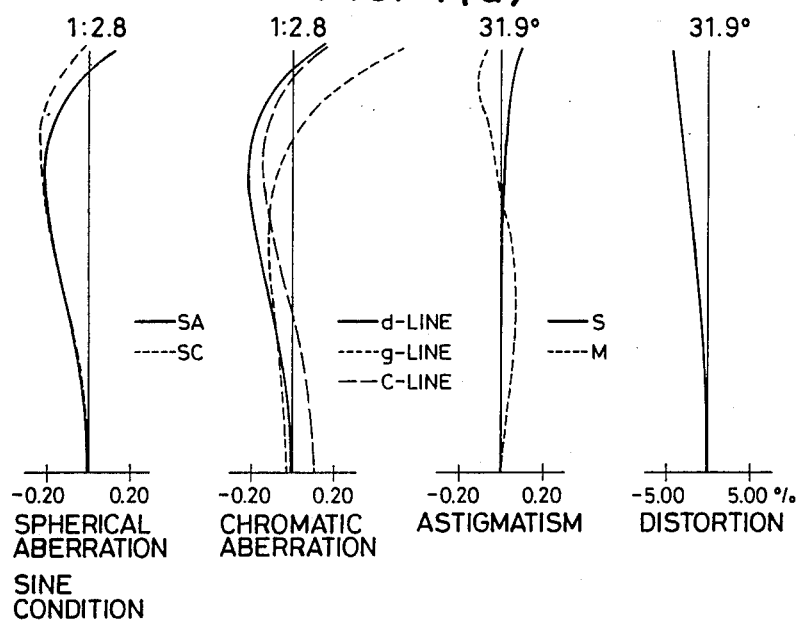
Figure 4B:
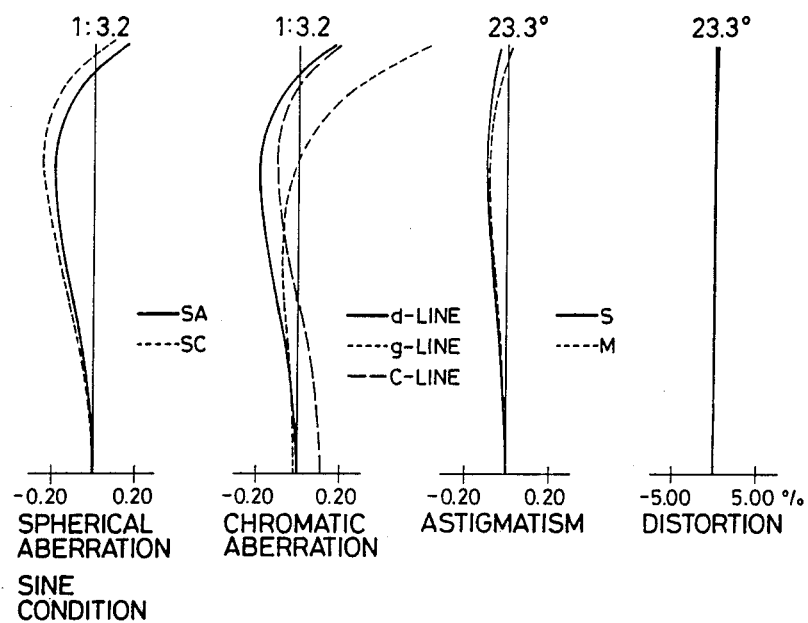
Figure 4C:
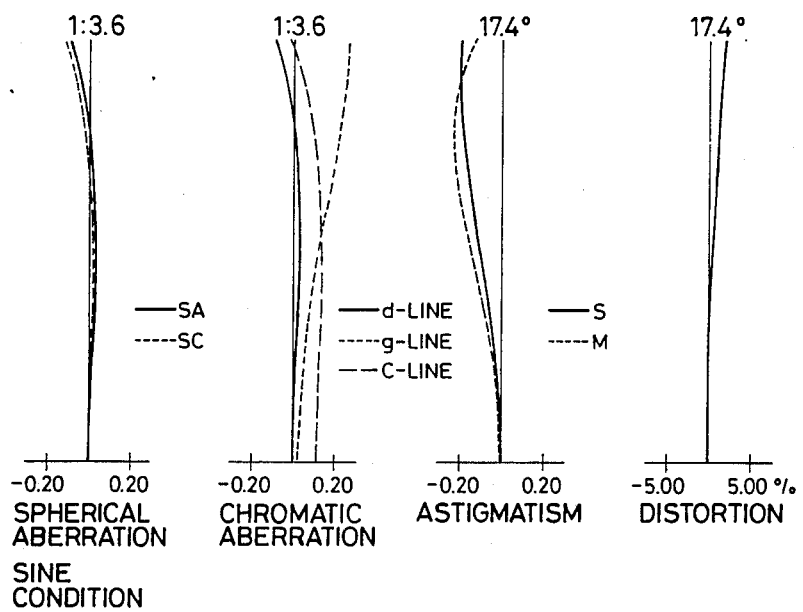
Figure 5:
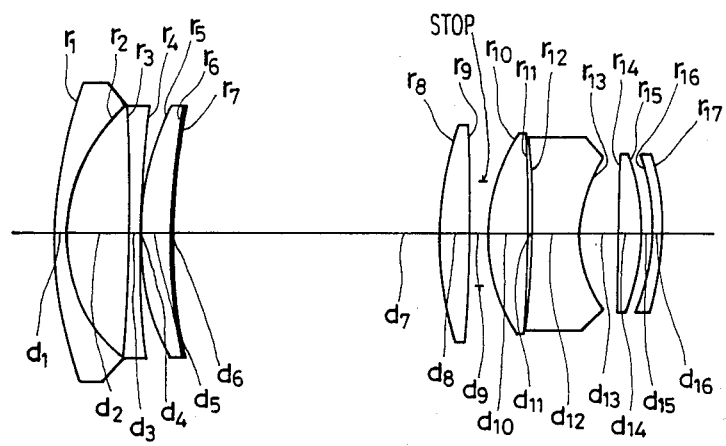
Figure 6A:
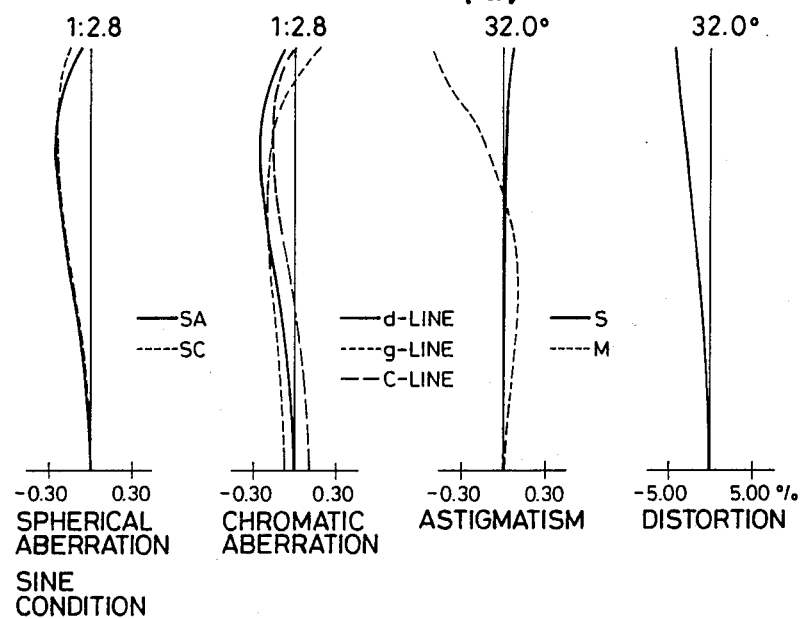
Figure 7:
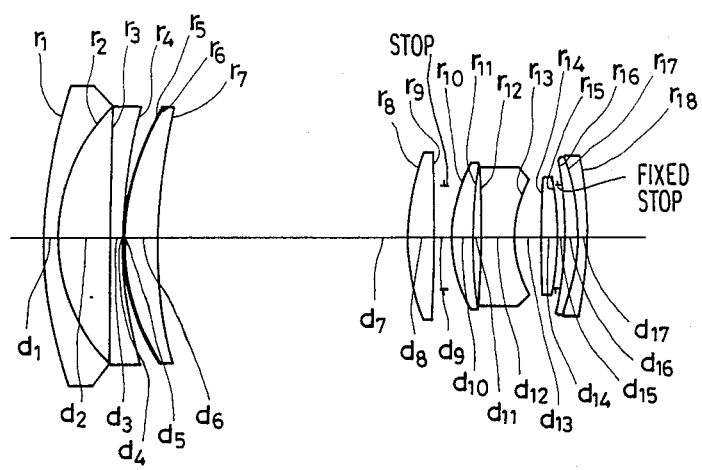
Figure 8A:
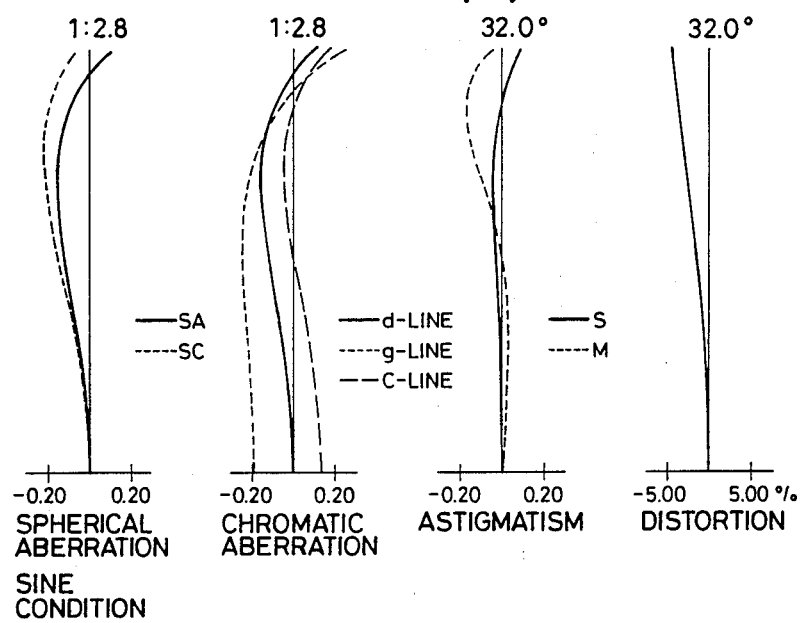
Figure 8B:
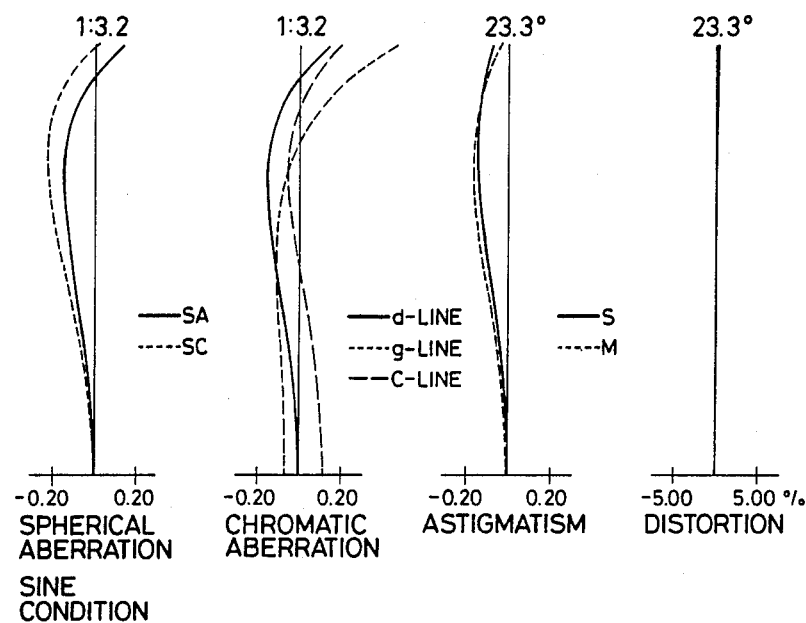
Figure 8C:
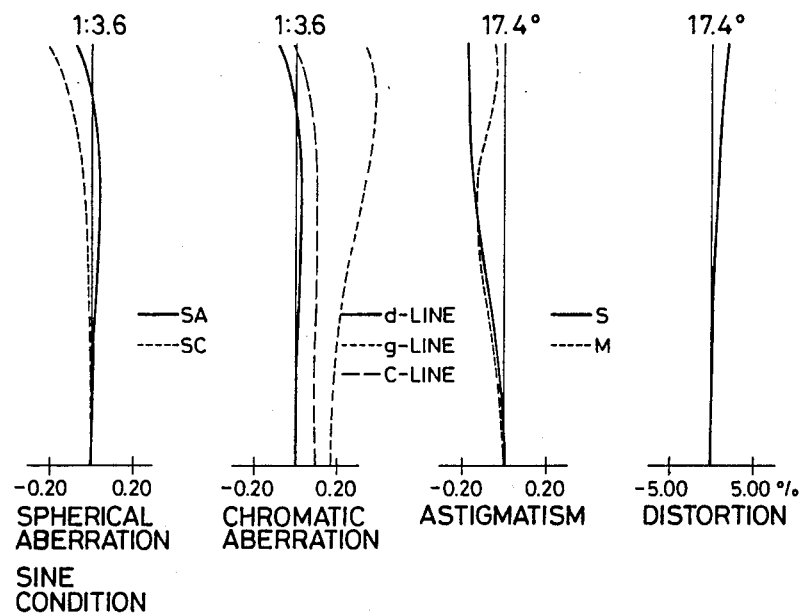
Figure 9:
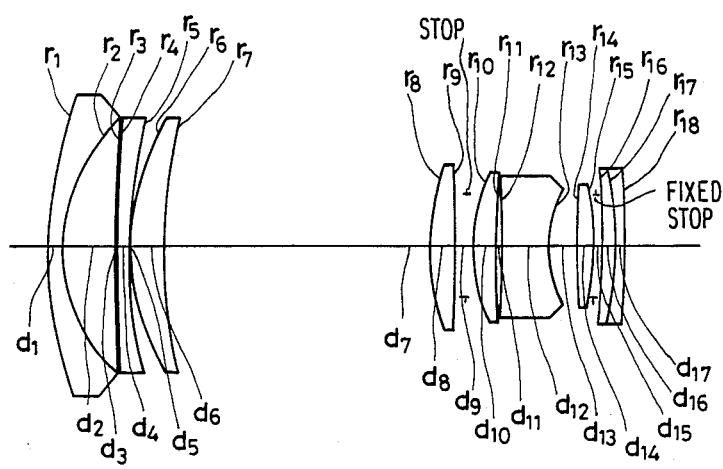
Figure 10A:
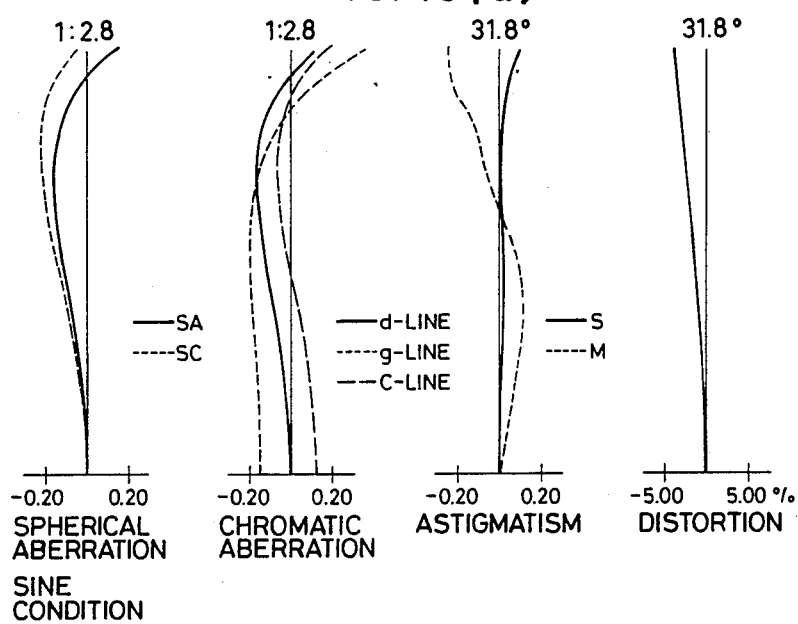
Figure 10B:
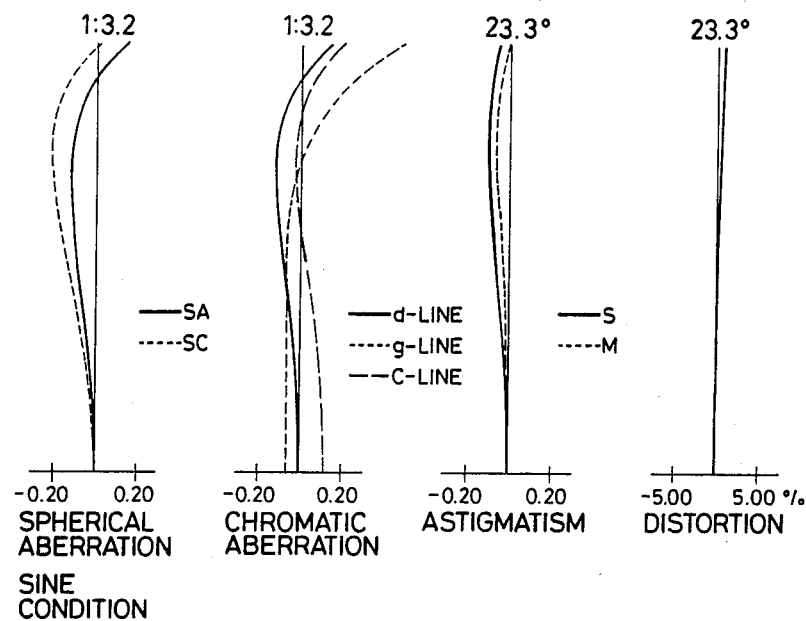
Figure 10C:
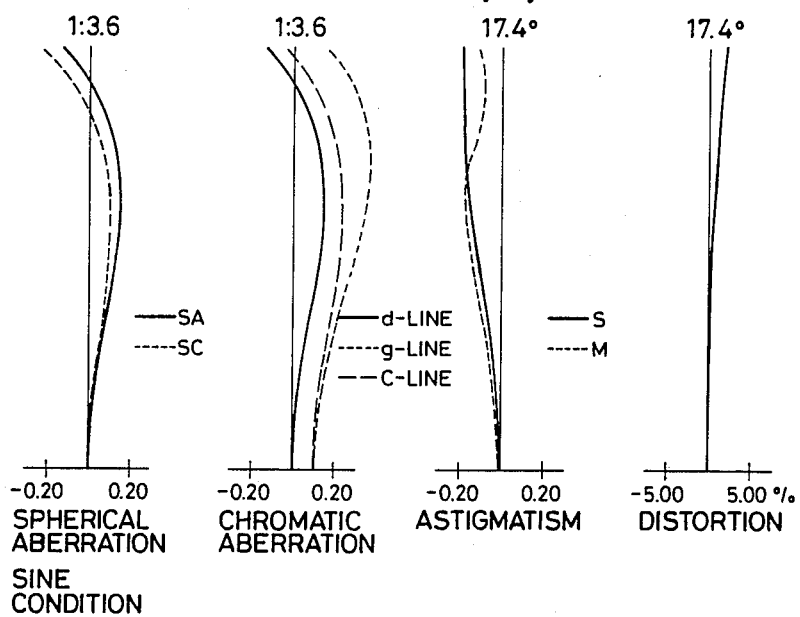
Figure 11:
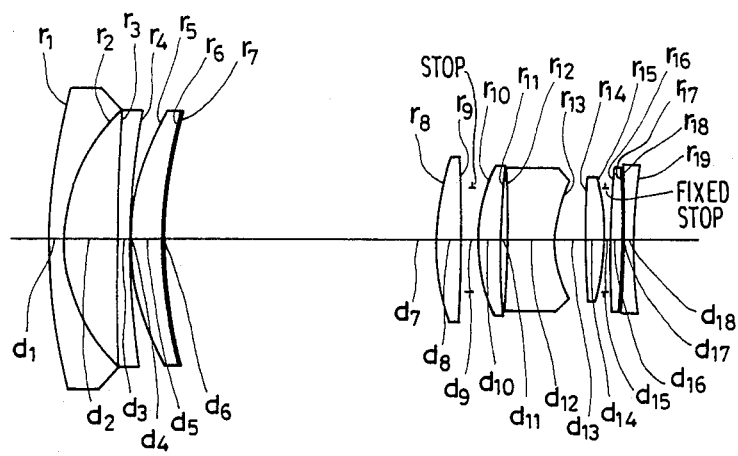
Figure 12A:
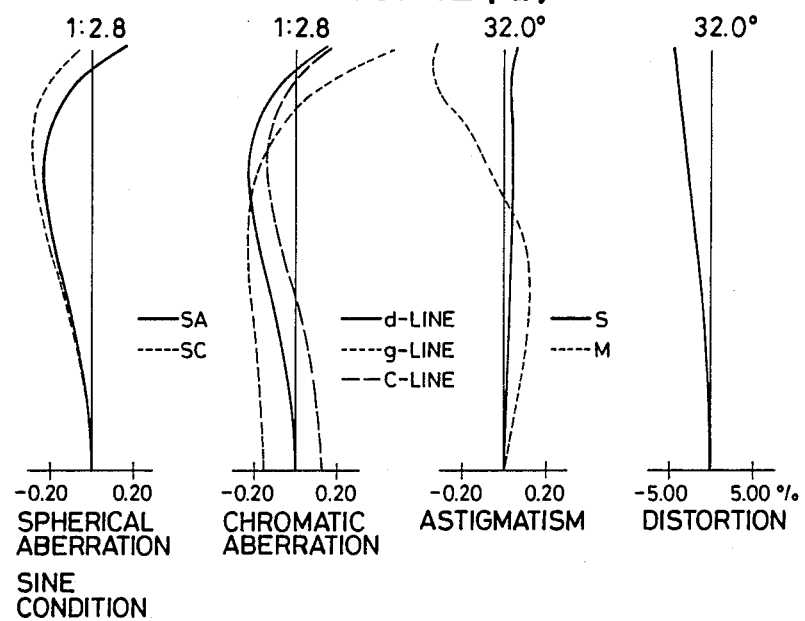
Figure 12B:
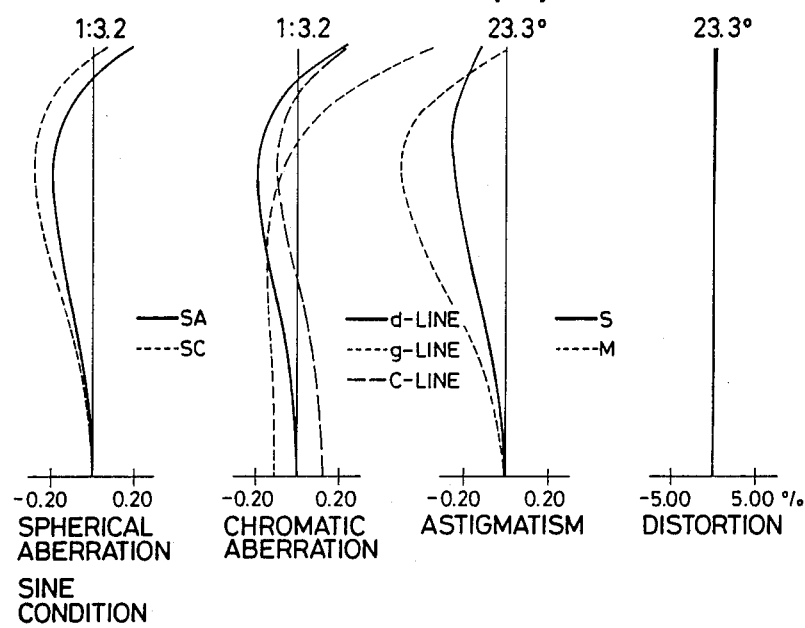
Figure 12C:
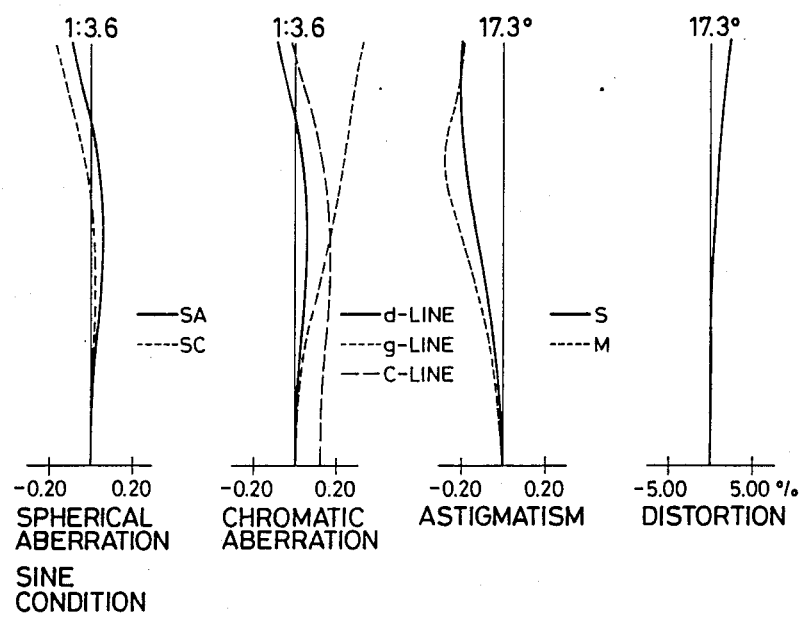
Figure 13:
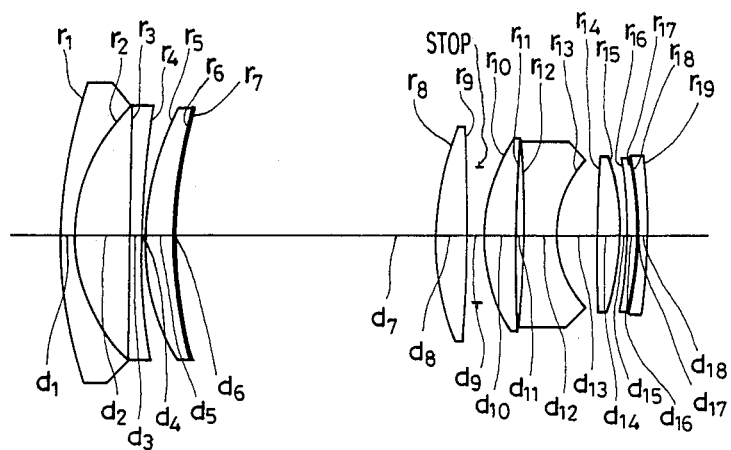
Figure 14A:
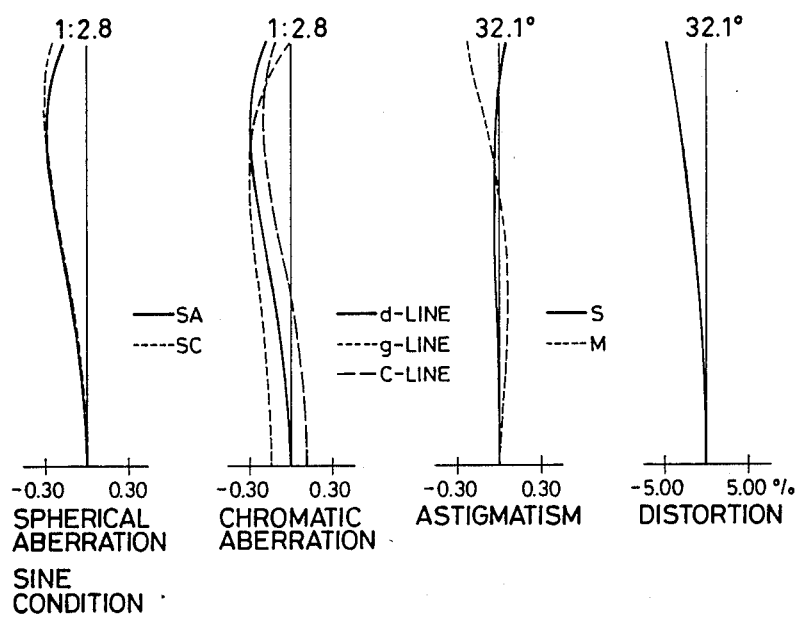
Figure 14B:
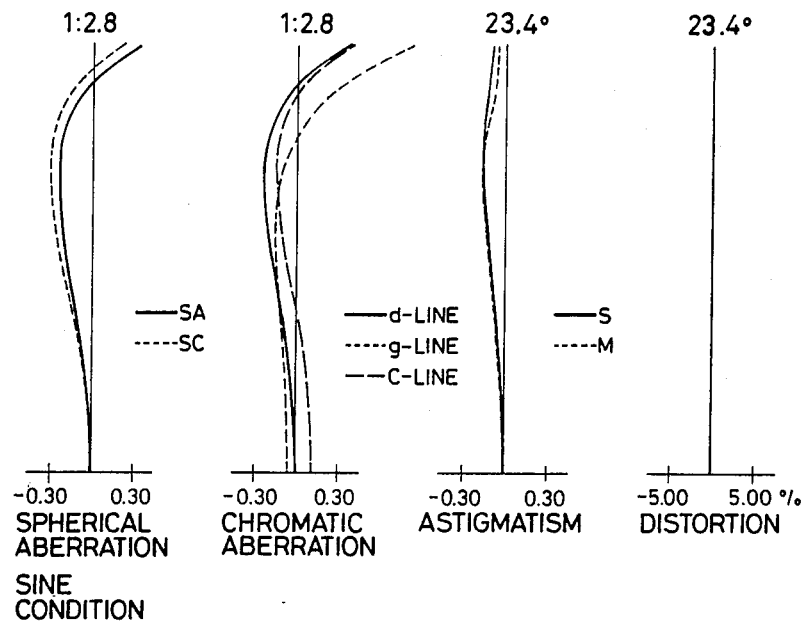
Figure 14C:
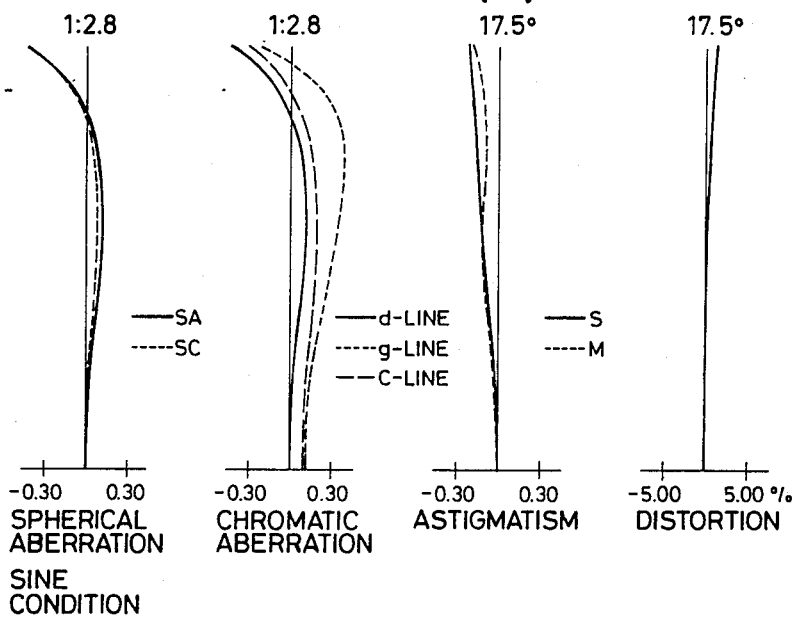
Figure 15:
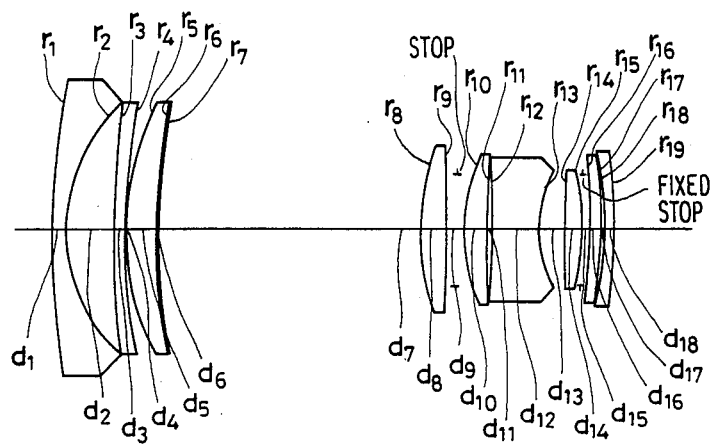
Figure 16A:
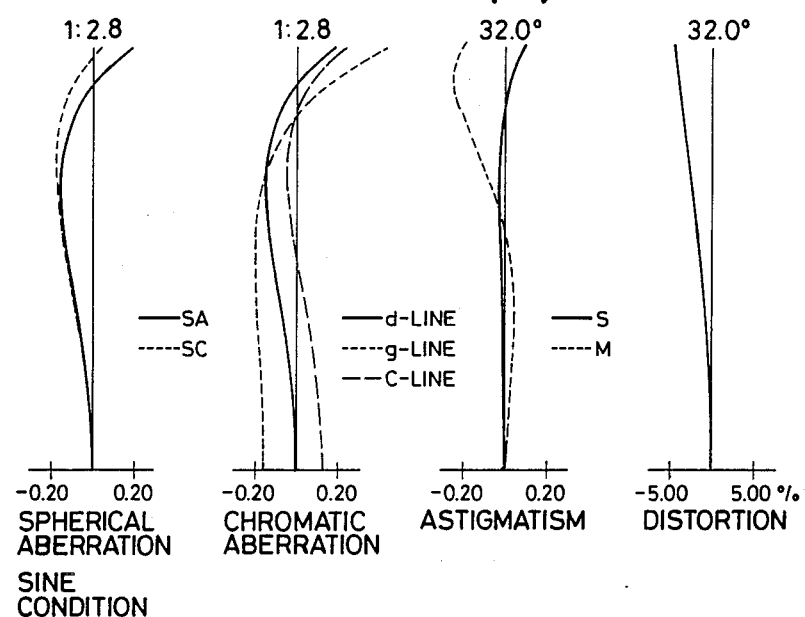
Figure 16B:
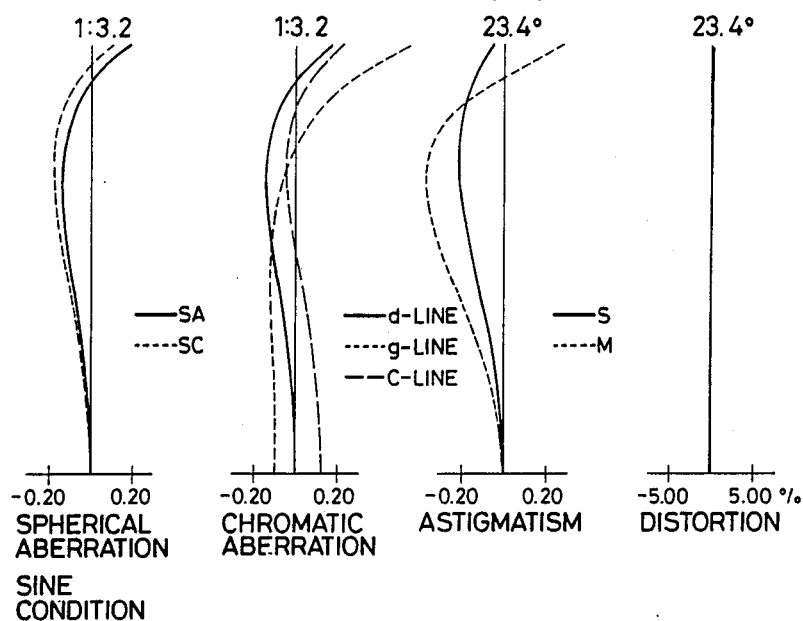
Figure 16C:
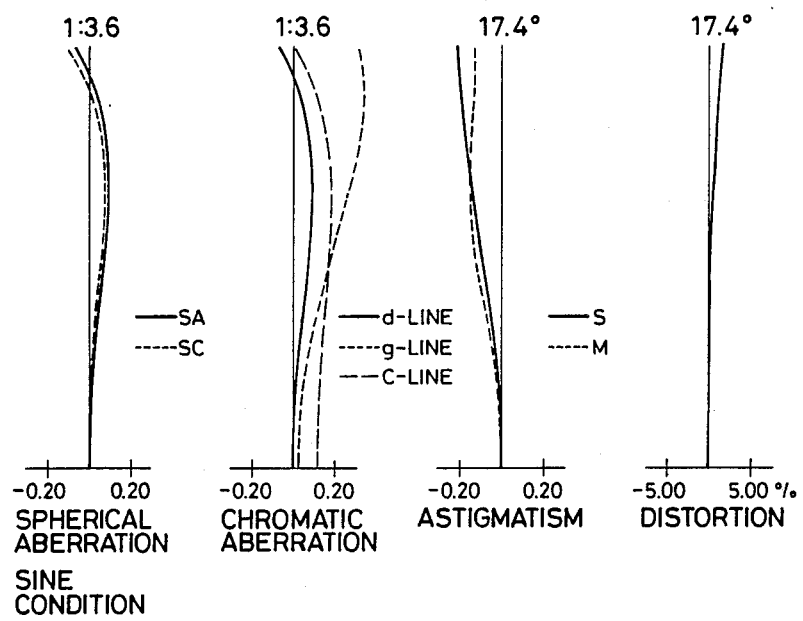

As for the composition of the first and second lens units, the zoom lens system of the present invention employs a seven-unit-seven-element composition which is generally similar to the system featuring an $F_{NO}$ of 1:2.8 which is proposed in Japanese Patent Application (OPI) No. 83543/1976. However, the powers of these lens units in the system of the present invention are made to be sufficiently greater than in the prior art system to permit the first lens unit to be displaced by a smaller amount. Furthermore, the system of the present invention has a fixed third lens unit with a negative refractive power disposed behind the second lens unit and this is effective in reducing the amount of displacement of the second lens unit.

Prior art zoom lens systems having an aperture ratio on the order of $F_{NO}$ 1:2.8 have had the problem that increased comatic flare develops if the powers of the first and second lens units are increased and that an even greater comatic aberration occurs if a negative third lens unit is disposed behind the second lens unit. In the present invention, an aspherical lens surface is provided in the first lens unit and this is effective not only in reducing the comatic aberration that develops in the combination of the first and second lens units but also in ensuring satisfactory performance even if a fixed third lens unit is added to the two-unit composition.

If an aperture ratio is made as bright as an $F_{NO}$ of about 1:2.8 without using any aspherical lens surface in the first unit and if the overall length of the lens system is made short as in the present invention, the curvature of field will exhibit a great variation, i.e., undercompensated at the wide-angle end and overcompensated at the narrow-angle end. According to the present invention, an aspherical surface is provided in the first lens unit which by its nature allows off-axis rays of light to pass at the wide-angle end at a different position that when it is at the narrow-angle end; this contributes to the accomplishment of the following three objectives: a brighter F number, compactness, and small variation in field curvature.

The amount of displacement of the second lens unit, $\Delta X_2$, can be expressed by:

$$\Delta X_2 = \frac{f_2}{|f_1|} \cdot \frac{(f_L - f_S)}{m_3}$$

where $f_S$ is the focal length of the overall system at the wide-angle end. In a zoom lens system of the two-unit type, $m_3 = 1$, so if the power of each lens unit is increased, $\Delta X_2$ would also increase because $f_1$ has a tendency to decrease by a greater amount than $f_2$. On the other hand, in a zoom lens system of the third-unit fixed type where a negative lens is disposed in the third unit, $m_3 > 1$ and $\Delta X_2$ can be made small even if the powers of the first and second lens units are made larger than in the zoom lens system of the two-unit type.

As evidenced from the above-noted formula for the amount of displacement of the second lens unit, $\Delta X_2$ can be made smaller by decreasing $f_2/|f_1|$ in condition (1). If the lower limit of this condition is not reached, $|f_1|$ increases (since the second lens unit is a master lens, and $f_2$ will not change greatly with lens type), and a circumstance favorable for decreasing $\Delta X_2$ will result. However, $\Delta X_1$ (the amount of displacement of the first lens unit) will increase and the corresponding increase in the overall lens length at the wide-angle end and the diameter of the front lens unit makes it difficult to attain a compact lens system. If the upper limit of condition (1) is exceeded, $|f_1|$ will decrease as in the system shown in Japanese OPI No. 111013/1983 and $\Delta X_2$ will increase despite the incorporation of a fixed third-lens unit. Furthermore, great aberration changes will occur during zooming.

Condition (2) sets forth the requirement for the power of the first lens unit. If condition (1) is the only condition to be satisfied, one simply needs to be sure that the power of the first lens unit is smaller. Condition (2) is introduced in order to decrease the amount of displacement of the first lens unit and the diameter of the front lens unit by putting a constraint on the power of the first lens unit. The power of the first lens unit in a zoom lens system intended to feature an aperture ratio of $F_{NO}$ of about 1:2.8 or on the order of 1:2.8–1:3.5 has to be made somewhat smaller than in a system with $F_{NO}$ on the order of 1:3.5–1:4.5. If the lower limit of condition (2) is not reached, the power of the first lens unit is increased to an extent that the upper limit of condition (1) is exceeded, causing great aberrational variations during zooming and focusing as already mentioned. If the upper limit of condition (2) is exceeded, a circumstance favorable for aberrational compensation will result but a compact lens system cannot be attained.

Condition (3) sets forth the requirement that should be satisfied by the magnifying power of the third lens unit. If the lower limit of this condition is not reached, $\Delta X_2$ will become greater than in the case of a zoom lens system of the two-unit type. If the upper limit of condition (3) is exceeded, a circumstance very favorable for decreasing $\Delta X_2$ will result, but on the other hand, the third lens unit cannot be composed of a single negative lens element or a cemented negative lens of a one-unit-two-element composition since the comatic flare that has developed in the combination of the first and second lens units will be intensified by an amount corresponding to the magnifying power of the third lens unit.

Condition (4) sets forth a requirement of the negative lens elements in the first lens unit. The more compact a given lens system is, the greater is the chance of the Petzval sum of assuming a negative value if condition (4) is not met. A notable problem is that astigmatism that occurs in the sagittal direction at the wide-angle end is overcompensated and cannot be effectively compensated.

Condition (5) sets forth the requirement that should be met by the positive lens elements in the second lens unit on this object side. In order to attain a brightness on the order of $F_{NO}$ of about 1:2.8, the zoom lens system of the present invention has to employ an optical material having a higher refractive index thant he materials used in the systems featuring $F_{NO}$ in the range of 1:3.5–1:4.5. The more compact a given lens system is, the greater the variations that occur in aspherical and comatic aberrations during zooming if condition (5) is not met.

In a preferred embodiment of the present invention, a fixed diaphragm stop is disposed between the second and third lens units and is capable of being moved independently from the second lens unit. This is effective in eliminating the comatic flare of off-axis light over the range including the middle-angle and narrow-angle ends.

A number of examples of lens systems according to the present invention will now be described.

Examples 1 to 8 are described hereunder in terms of data sheets wherein: $F_{NO}$ signifies an F number, f designates a focal length, w designates a half view angle, $f_B$ designates a back focus, r designates the radius of curvature of an individual lens surface, d designates a lens thickness or aerial distance between lenses, N designates the refractive index at the d-line of an individual lens element, and designates the Abbe number of an individual lens element.

The asphericity function is expressed by the following formula:

$$X = \frac{c^2 y^2}{1 + \sqrt{1 - (1+K)c^2 y^2}} + a_4 y^4 + a_6 y^6 + a_8 y^8 + a_{10} y^{10}$$

Example 1:
$F_{NO} = 1:2.8 \sim 3.2 \sim 3.6$
$f = 36.00 \sim 50.00 \sim 68.00$
$\omega = 32.0 \sim 23.3 \sim 17.4$   $f_B = 37.73$

| Surface No. | r | d | n | ν |
|---|---|---|---|---|
| 1 | 69.093 | 1.80 | 1.79952 | 42.2 |
| 2 | 25.618 | 8.85 | | |
| 3 | 2872.647 | 1.70 | 1.77250 | 49.6 |
| 4 | 128.742 | 0.10 | | |
| 5 | 34.091 | 4.52 | 1.80518 | 25.4 |
| 6 | 58.975 | 0.20 | 1.58921 | 41.1 |
| 7 | 58.975 | 41.00~17.67~1.80 | | |
| 8 | 36.490 | 3.73 | 1.77250 | 49.6 |
| 9 | −293.149 | 2.70 | | |
| 10 | 25.382 | 3.66 | 1.77250 | 49.6 |
| 11 | 189.788 | 0.69 | | |
| 12 | −160.084 | 6.87 | 1.80518 | 25.4 |
| 13 | 17.720 | 6.02 | | |
| 14 | 987.761 | 2.58 | 1.62588 | 35.7 |
| 15 | −36.915 | 1.0~8.34~17.77 | | |
| 16 | −180.493 | 1.50 | 1.58913 | 61.0 |
| 17 | −434.076 | | | |

Aspherical 7th Surface

| | |
|---|---|
| K = 0.0 | $f_2 / |f_1| = 0.564$ |
| $a_4 = 0.10317 \times 10^{-5}$ | $|f_1| / f_L = 1.035$ |
| $a_6 = -0.22632 \times 10^{-8}$ | $m_3 = 1.075$ |
| $a_8 = 0.12723 \times 10^{-11}$ | $\overline{N_{1n}} = 1.786$ |
| $a_{10} = 0.0$ | $N_{2p} = 1.773$ |

Example 2:
$F_{NO} = 1:2.8 \sim 3.2 \sim 3.6$
$f = 36.20 \sim 50.00 \sim 68.00$
$\omega = 31.9 \sim 23.3 \sim 17.4$   $f_B = 38.00$

| Surface No. | r | d | n | ν |
|---|---|---|---|---|
| 1 | 64.868 | 1.80 | 1.83481 | 42.7 |
| 2 | 25.510 | 8.67 | | |
| 3 | 787.929 | 1.70 | 1.69680 | 55.5 |
| 4 | 110.318 | 0.10 | | |
| 5 | 33.811 | 4.15 | 1.80518 | 25.4 |
| 6 | 57.830 | 0.20 | 1.58921 | 41.1 |
| 7 | 57.830 | 42.02~18.40~2.00 | | |
| 8 | 38.661 | 3.54 | 1.77250 | 49.6 |
| 9 | −366.963 | 2.70 | | |

-continued

| | | | | |
|---|---|---|---|---|
| 10 | 25.467 | 3.78 | 1.77250 | 49.6 |
| 11 | 278.523 | 0.70 | | |
| 12 | −151.105 | 7.00 | 1.80518 | 25.4 |
| 13 | 18.090 | 6.18 | | |
| 14 | 776.102 | 2.71 | 1.62588 | 35.7 |
| 15 | −35.587 | 1.50~8.55~17.75 | | |
| 16 | −397.800 | 1.50 | 1.51633 | 64.1 |
| 17 | 397.800 | | | |

Aspherical 7th Surface $K = 0.0$           $f_2 / |f_1| = 0.562$
$a_4 = 0.71640 \times 10^{-6}$    $|f_1| / f_L = 1.041$
$a_6 = -0.24221 \times 10^{-8}$    $m_3 = 1.100$
$a_8 = 0.77670 \times 10^{-12}$    $\overline{N_{1n}} = 1.766$
$a_{10} = 0.0$           $\overline{N_{2p}} = 1.773$ Example 3:
$F_{NO} = 1:2.8$
$f = 36.20 \sim 50.00 \sim 68.00$
$\omega = 32.0 \sim 23.4 \sim 17.4$   $f_B = 38.61$

| Surface No. | r | d | n | ν |
|---|---|---|---|---|
| 1 | 61.738 | 1.85 | 1.79952 | 42.2 |
| 2 | 24.613 | 9.53 | | |
| 3 | −400.662 | 1.75 | 1.77250 | 49.6 |
| 4 | 147.834 | 0.10 | | |
| 5 | 39.374 | 4.48 | 1.80518 | 25.4 |
| 6 | 84.698 | 0.20 | 1.58921 | 41.1 |
| 7 | 84.698 | 41.00~18.00~2.03 | | |
| 8 | 51.342 | 4.61 | 1.77250 | 49.6 |
| 9 | −206.967 | 2.70 | | |
| 10 | 27.516 | 6.03 | 1.77250 | 49.6 |
| 11 | −359.810 | 0.77 | | |
| 12 | −101.819 | 7.00 | 1.80518 | 25.4 |
| 13 | 19.739 | 6.22 | | |
| 14 | −914.731 | 3.28 | 1.62588 | 35.7 |
| 15 | −34.321 | 1.50~9.18~19.20 | | |
| 16 | −35.000 | 1.70 | 1.58913 | 61.2 |
| 17 | −39.055 | | | |

Aspherical 7th Surface $K = 0.0$           $f_2 / |f_1| = 0.598$
$a_4 = 0.22413 \times 10^{-6}$    $|f_1| / f_L = 1.007$
$a_6 = -0.3214 \times 10^{-8}$    $m_3 = 1.075$
$a_8 = 0.75129 \times 10^{-12}$    $\overline{N_{1n}} = 1.786$
$a_{10} = 0.0$           $\overline{N_{2p}} = 1.773$ Example 4:
$F_{NO} = 1:2.8 \sim 3.2 \sim 3.6$
$f = 36.20 \sim 50.00 \sim 68.00$
$\omega = 32.0 \sim 23.3 \sim 17.4$   $f_B = 37.00$

| Surface No. | r | d | n | ν |
|---|---|---|---|---|
| 1 | 63.377 | 2.00 | 1.83400 | 37.2 |
| 2 | 25.871 | 8.18 | | |
| 3 | 789.315 | 1.90 | 1.77250 | 49.6 |
| 4 | 67.202 | 0.10 | | |
| 5 | 31.770 | 0.50 | 1.58921 | 41.1 |
| 6 | 36.450 | 4.69 | 1.80518 | 25.4 |
| 7 | 77.825 | 37.91~16.71~2.00 | | |
| 8 | 31.031 | 4.03 | 1.77250 | 49.6 |
| 9 | −420.942 | 2.70 | | |
| 10 | 22.268 | 3.43 | 1.77250 | 49.6 |
| 11 | 68.048 | 1.04 | | |
| 12 | −328.390 | 5.00 | 1.80518 | 25.4 |
| 13 | 16.156 | 4.27 | | |
| 14 | 134.754 | 2.49 | 1.58144 | 40.7 |
| 15 | −42.066 | 1.10~8.32~17.74 | | |
| 16 | −49.530 | 1.92 | 1.67270 | 32.1 |
| 17 | −34.444 | 1.50 | 1.69680 | 55.5 |
| 18 | −52.939 | | | |

Aspherical 5th Surface $K = 0.0$           $f_2 / |f_1| = 0.553$
$a_4 = -0.25031 \times 10^{-5}$    $|f_1| / f_L = 1.015$
$a_6 = -0.39697 \times 10^{-10}$    $m_3 = 1.056$
$a_8 = 0.33988 \times 10^{-12}$    $\overline{N_{1n}} = 1.803$
$a_{10} = -0.46099 \times 10^{-14}$    $\overline{N_{2p}} = 1.773$ Example 5:
$F_{NO} = 1:2.8 \sim 3.2 \sim 3.6$
$f = 36.20 \sim 50.00 \sim 68.00$
$\omega = 31.8 \sim 23.3 \sim 17.4$   $f_B = 37.00$

| Surface No. | r | d | n | ν |
|---|---|---|---|---|
| 1 | 63.008 | 2.00 | 1.83400 | 37.2 |
| 2 | 25.021 | 8.47 | | |
| 3 | 657.128 | 0.20 | 1.58921 | 41.1 |
| 4 | 657.128 | 1.90 | 1.77250 | 49.6 |
| 5 | 82.683 | 0.10 | | |
| 6 | 35.270 | 5.07 | 1.80518 | 25.4 |
| 7 | 80.294 | 40.56~17.80~2.00 | | |
| 8 | 33.498 | 3.91 | 1.77250 | 49.6 |
| 9 | −380.690 | 2.70 | | |
| 10 | 25.346 | 3.4 | 1.77250 | 49.6 |
| 11 | 107.426 | 0.96 | | |
| 12 | −171.93 | 6.68 | 1.80518 | 25.4 |
| 13 | 17.562 | 4.49 | | |
| 14 | 155.604 | 2.61 | 1.58144 | 40.7 |
| 15 | −37.313 | 1.30~8.32~17.48 | | |
| 16 | −98.218 | 1.81 | 1.67270 | 32.1 |
| 17 | −55.574 | 1.50 | 1.69680 | 55.5 |
| 18 | −135.135 | | | |

Aspherical 3rd Surface $K = 0.0$           $f_2 / |f_1| = 0.555$
$a_4 = -0.10867 \times 10^{-5}$    $|f_1| / f_L = 1.033$
$a_6 = 0.38254 \times 10^{-8}$    $m_3 = 1.090$
$a_8 = -0.75690 \times 10^{-11}$    $\overline{N_{1n}} = 1.803$
$a_{10} = 0.11202 \times 10^{-13}$    $\overline{N_{2p}} = 1.773$ Example 6:
$F_{NO} = 1:2.8 \sim 3.2 \sim 3.6$
$f = 36.20 \sim 50.00 \sim 68.00$
$\omega = 32.0 \sim 23.3 \sim 17.3$   $f_B = 37.80$

| Surface No. | r | d | n | ν |
|---|---|---|---|---|
| 1 | 89.074 | 2.00 | 1.79952 | 42.2 |
| 2 | 26.111 | 8.17 | | |
| 3 | 569.990 | 1.90 | 1.77250 | 49.6 |
| 4 | 121.960 | 0.10 | | |
| 5 | 35.687 | 4.73 | 1.80518 | 25.4 |
| 6 | 68.451 | 0.20 | 1.58921 | 41.1 |
| 7 | 68.451 | 41.88~18.34~2.00 | | |
| 8 | 34.351 | 3.87 | 1.77250 | 49.6 |
| 9 | −405.893 | 2.70 | | |
| 10 | 26.060 | 3.47 | 1.77250 | 49.6 |
| 11 | 120.217 | 0.91 | | |
| 12 | −142.298 | 7.00 | 1.80518 | 25.4 |
| 13 | 18.320 | 4.78 | | |
| 14 | 136.211 | 2.84 | 1.58144 | 40.7 |
| 15 | −34.654 | 1.10~7.83~16.61 | | |
| 16 | 207.252 | 1.92 | 1.67270 | 32.1 |
| 17 | −224.694 | 0.0 | | |
| 18 | −224.694 | 1.50 | 1.69680 | 55.5 |
| 19 | 95.103 | | | |

Aspherical 7th Surface $K = 0.0$           $f_2/|f_1| = 0.560$
$a_4 = 0.81081 \times 10^{-6}$    $|f_1|/f_L = 1.017$
$a_6 = -0.40136 \times 10^{-8}$    $m_3 = 1.150$
$a_8 = 0.28045 \times 10^{-11}$    $\overline{N_{1n}} = 1.786$
$a_{10} = 0.0$           $\overline{N_{2p}} = 1.773$ Example 7:
$F_{NO} = 1:2.8$
$f = 36.20 \sim 50.00 \sim 68.00$
$\omega = 32.1 \sim 23.4 \sim 17.5$   $f_B = 37.80$ -continued

Example 7:

| Surface No. | r | d | n | ν |
|---|---|---|---|---|
| 1 | 69.146 | 2.00 | 1.79952 | 42.2 |
| 2 | 25.460 | 8.87 | | |
| 3 | 7165.208 | 1.90 | 1.77250 | 49.6 |
| 4 | 129.006 | 0.35 | | |
| 5 | 36.743 | 4.33 | 1.80518 | 25.4 |
| 6 | 66.512 | 0.20 | 1.58921 | 41.1 |
| 7 | 66.512 | 39.69~17.45~2.00 | | |
| 8 | 38.773 | 4.92 | 1.77250 | 49.6 |
| 9 | −364.554 | 2.70 | | |
| 10 | 25.742 | 4.91 | 1.77250 | 49.6 |
| 11 | 178.517 | 1.19 | | |
| 12 | −154.655 | 5.30 | 1.80518 | 25.4 |
| 13 | 18.497 | 5.83 | | |
| 14 | 215.167 | 3.37 | 1.58144 | 40.7 |
| 15 | −36.431 | 1.10~8.73~18.67 | | |
| 16 | −71.605 | 1.66 | 1.60342 | 38.0 |
| 17 | −49.094 | 0.0 | | |
| 18 | −49.094 | 1.50 | 1.69680 | 55.5 |
| 19 | −79.102 | | | |

Aspherical 7th Surface

$K = 0.0$
$a_4 = 0.51170 \times 10^{-6}$
$a_6 = -0.26068 \times 10^{-8}$
$a_8 = 0.56946 \times 10^{-12}$
$a_{10} = 0.0$ $f_2/|f_1| = 0.591$
$|f_1|/f_L = 0.999$
$m_3 = 1.070$
$\overline{N_{1n}} = 1.786$
$\overline{N_{2p}} = 1.773$

Example 8:

$F_{NO} = 1:2.8\sim3.2\sim3.6$
$f = 36.20\sim50.00\sim68.00$
$\omega = 32.0\sim23.4\sim17.4 \quad f_B = 37.80$

| Surface No. | r | d | n | ν |
|---|---|---|---|---|
| 1 | 119.151 | 2.00 | 1.79952 | 42.2 |
| 2 | 25.366 | 7.14 | | |
| 3 | 129.090 | 1.90 | 1.77250 | 49.6 |
| 4 | 92.893 | 0.10 | | |
| 5 | 38.489 | 4.65 | 1.80518 | 25.4 |
| 6 | 83.341 | 0.20 | 1.58921 | 41.1 |
| 7 | 83.341 | 40.44~17.75~2.00 | | |
| 8 | 33.808 | 3.93 | 1.77250 | 49.6 |
| 9 | −401.330 | 2.70 | | |
| 10 | 26.422 | 3.46 | 1.77250 | 49.6 |
| 11 | 125.719 | 0.87 | | |
| 12 | −150.833 | 7.00 | 1.80518 | 25.4 |
| 13 | 18.279 | 4.11 | | |
| 14 | 309.005 | 2.59 | 1.58144 | 40.7 |
| 15 | −35.631 | 1.10~8.54~18.24 | | |
| 16 | −131.276 | 1.81 | 1.71736 | 29.5 |
| 17 | −69.939 | 0.50 | | |
| 18 | −48.221 | 1.50 | 1.69680 | 55.5 |
| 19 | −81.622 | | | |

Aspherical 7th Surface

$K = 0.0$
$a_4 = -0.15414 \times 10^{-5}$
$a_6 = -0.39349 \times 10^{-8}$
$a_8 = -0.18128 \times 10^{-11}$
$a_{10} = 0.0$ $f_2/|f_1| = 0.566$
$|f_1|/f_L = 1.041$
$m_3 = 1.050$
$\overline{N_{1n}} = 1.786$
$\overline{N_{2p}} = 1.773$

What is claimed is:

1. A compact and high-speed wide-angle zoom lens system having a sub-system responsible for zooming and an F-number of 1:2.8 to 1:3.5, said sub-system comprising, in order from the object side: a first lens unit having a negative focal length, a second lens unit having a positive focal length and a fixed third lens unit forming a relay lens sub-system that is subsequent to the zooming sub-system and which extends the focal length thereof, said lens system being capable of changing its focal length while maintaining a constant focal position by mechanically moving the first and second lens units, the improvement wherein the first lens unit has at least one aspherical surface and is of a three-unit-three-element composition comprising, in order from the object side, a negative meniscus lens element having a concave surface of large curvature on the image side, a negative lens element, and a positive lens element having a convex surface of large curvature on the object side, and the second lens unit has a four-unit-four-element composition comprising, in order from the object side, two positive lens elements, each having a convex surface of large curvature on the object side, a negative lens element having a surface of concave curvature on the image side, and a positive lens element having a convex surface of large curvature on the image side, said lens system further satisfying the following conditions:

(1) $0.5 < f_2/f_1 < 0.63$
(2) $0.9 < f_1/f_L < 1.2$
(3) $1.0 < m_3 < 1.2$
(4) $1.7 < N_{1n}$
(5) $1.7 < N_{2p}$ where,
$f_1$ is the focal length of the first lens unit;
$f_2$ is the focal length of the second lens unit;
$F_L$ is the focal length of the overall system at the narrow-angle end;
$m_3$ is magnification by the third lens unit;
$N_{1n}$ is the average of the refractive indices at the d-line of the two negative lens elements in the first lens unit; and
$N_{2p}$ is the average of the refractive indices at the d-line of the two positive lens elements in the second lens unit on its object side.

2. A zoom lens system according to claim 1 wherein the third lens unit consists of a single negative lens element.

3. A zoom lens system according to claim 1 wherein the third lens unit consists of a cemented negative lens of a one-unit-two-element composition wherein a positive lens element is cemented to a negative lens element.

4. A zoom lens system according to claim 1 wherein the third lens unit is in the form of a negative lens unit having a two-unit-two-element composition consisting of a positive and a negative lens element.

5. A zoom lens system according to any one of claims 1 to 4 wherein a diaphragm stop is disposed between the second and third lens units in such a way that said diaphragm stop is displaced independently of the second lens unit by a smaller amount than said second lens unit when zooming is effected from the wide-angle end to the narrow-angle end.

6. A zoom lens system according to claim 1, further satisfying the following chart:

$F_{NO} = 1:2.8\sim3.2\sim3.6$
$f = 36.00\sim50.00\sim68.00$
$w = 32.0\sim23.3\sim17.4 \quad f_B = 37.73$

| Surface No. | r | d | n | ν |
|---|---|---|---|---|
| 1 | 69.093 | 1.80 | 1.79952 | 42.2 |
| 2 | 25.618 | 8.85 | | |
| 3 | 2872.647 | 1.70 | 1.77250 | 49.6 |
| 4 | 128.742 | 0.10 | | |
| 5 | 34.091 | 4.52 | 1.80518 | 25.4 |
| 6 | 58.975 | 0.20 | 1.58921 | 41.1 |
| 7 | 58.975 | 41.00~17.67~1.80 | | |
| 8 | 36.490 | 3.73 | 1.77250 | 49.6 |
| 9 | −293.149 | 2.70 | | |
| 10 | 25.382 | 3.66 | 1.77250 | 49.6 |
| 11 | 189.788 | 0.69 | | |
| 12 | −160.084 | 6.87 | 1.80518 | 25.4 |

-continued

| | | | | |
|---|---|---|---|---|
| 13 | 17.720 | 6.02 | | |
| 14 | 987.761 | 2.58 | 1.62588 | 35.7 |
| 15 | −36.915 | 1.0~8.34~17.77 | | |
| 16 | −180.493 | 1.50 | 1.58913 | 61.0 |
| 17 | −434.076 | | | |

Aspherical 7th Surface

| | |
|---|---|
| K = 0.0 | $f_2/\|f_1\| = 0.564$ |
| $a_4 = 0.10317 \times 10^{-5}$ | $\|f_1\|/f_L = 1.035$ |
| $a_6 = -0.22632 \times 10^{-8}$ | $m_3 = 1.075$ |
| $a_8 = 0.12723 \times 10^{-11}$ | $\overline{N_{1n}} = 1.786$ |
| $a_{10} = 0.0$ | $\overline{N_{2p}} = 1.773$ | where $F_{NO}$ signifies an F number, f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

7. A zoom lens system according to claim 1, further satisfying the following chart:

$F_{NO} = 1:2.8~3.2~3.6$
$f = 36.20~50.00~68.00$
$w = 31.9~23.3~17.4$  $f_B = 38.00$

| Surface No. | r | d | n | v |
|---|---|---|---|---|
| 1 | 64.868 | 1.80 | 1.83481 | 42.7 |
| 2 | 25.510 | 8.67 | | |
| 3 | 787.929 | 1.70 | 1.69680 | 55.5 |
| 4 | 110.318 | 0.10 | | |
| 5 | 33.811 | 4.15 | 1.80518 | 25.4 |
| 6 | 57.830 | 0.20 | 1.58921 | 41.1 |
| 7 | 57.830 | 42.02~18.40~2.00 | | |
| 8 | 38.661 | 3.54 | 1.77250 | 49.6 |
| 9 | −366.963 | 2.70 | | |
| 10 | 25.467 | 3.78 | 1.77250 | 49.6 |
| 11 | 278.523 | 0.70 | | |
| 12 | −151.105 | 7.00 | 1.80518 | 25.4 |
| 13 | 18.090 | 6.18 | | |
| 14 | 776.102 | 2.71 | 1.62588 | 35.7 |
| 15 | −35.587 | 1.50~8.55~17.75 | | |
| 16 | −397.800 | 1.50 | 1.51633 | 64.1 |
| 17 | 397.800 | | | |

Aspherical 7th Surface

| | |
|---|---|
| K = 0.0 | $f_2/\|f_1\| = 0.562$ |
| $a_4 = 0.71640 \times 10^{-6}$ | $\|f_1\|/f_L = 1.041$ |
| $a_6 = -0.24221 \times 10^{-8}$ | $m_3 = 1.100$ |
| $a_8 = 0.77670 \times 10^{-12}$ | $\overline{N_{1n}} = 1.766$ |
| $a_{10} = 0.0$ | $\overline{N_{2p}} = 1.773$ | where $F_{NO}$ signifies an F number, f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

8. A zoom lens system according to claim 1, further satisfying the following chart:

$F_{NO} = 1:2.8$
$f = 36.20~50.00~68.00$
$w = 32.0~23.4~17.4$  $f_B = 38.61$

| Surface No. | r | d | n | v |
|---|---|---|---|---|
| 1 | 61.738 | 1.85 | 1.79952 | 42.2 |
| 2 | 24.613 | 9.53 | | |
| 3 | −400.662 | 1.75 | 1.77250 | 49.6 |
| 4 | 147.834 | 0.10 | | |
| 5 | 39.374 | 4.48 | 1.80518 | 25.4 |
| 6 | 84.698 | 0.20 | 1.58921 | 41.1 |
| 7 | 84.698 | 41.00~18.00~2.03 | | |
| 8 | 51.342 | 4.61 | 1.77250 | 49.6 |
| 9 | −206.967 | 2.70 | | |
| 10 | 27.516 | 6.03 | 1.77250 | 49.6 |
| 11 | −359.810 | 0.77 | | |
| 12 | −101.819 | 7.00 | 1.80518 | 25.4 |
| 13 | 19.739 | 6.22 | | |
| 14 | −914.731 | 3.28 | 1.62588 | 35.7 |
| 15 | −34.321 | 1.50~9.18~19.20 | | |
| 16 | −35.000 | 1.70 | 1.58913 | 61.2 |
| 17 | −39.055 | | | |

Aspherical 7th Surface

| | |
|---|---|
| K = 0.0 | $f_2\|f_1\| = 0.598$ |
| $a_4 = 0.22413 \times 10^{-6}$ | $\|f_1\|/f_L = 1.007$ |
| $a_6 = -0.32184 \times 10^{-8}$ | $m_3 = 1.075$ |
| $a_8 = 0.75129 \times 10^{-12}$ | $\overline{N_{1n}} = 1.786$ |
| $a_{10} = 0.0$ | $\overline{N_{2p}} = 1.773$ | where $F_{NO}$ signifies an F number, f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

9. A zoom lens system according to claim 1, further satisfying the following chart:

$F_{NO} = 1:2.8~3.2~3.6$
$f = 36.20~50.00~68.00$
$w = 32.0~23.3~17.4$  $f_B = 37.00$

| Surface No. | r | d | n | v |
|---|---|---|---|---|
| 1 | 63.377 | 2.00 | 1.83400 | 37.2 |
| 2 | 25.871 | 8.18 | | |
| 3 | 789.315 | 1.90 | 1.77250 | 49.6 |
| 4 | 67.202 | 0.10 | | |
| 5 | 31.770 | 0.50 | 1.58921 | 41.1 |
| 6 | 36.450 | 4.69 | 1.80518 | 25.4 |
| 7 | 77.825 | 37.91~16.71~2.00 | | |
| 8 | 31.031 | 4.03 | 1.77250 | 49.6 |
| 9 | −420.942 | 2.70 | | |
| 10 | 22.268 | 3.43 | 1.77250 | 49.6 |
| 11 | 68.048 | 1.04 | | |
| 12 | −328.390 | 5.00 | 1.80518 | 25.4 |
| 13 | 16.156 | 4.27 | | |
| 14 | 134.754 | 2.49 | 1.58144 | 40.7 |
| 15 | −42.066 | 1.10~8.32~17.74 | | |
| 16 | −49.530 | 1.92 | 1.67270 | 32.1 |
| 17 | −34.444 | 1.50 | 1.69680 | 55.5 |
| 18 | −52.939 | | | |

Aspherical 5th Surface

| | |
|---|---|
| K = 0.0 | $f_2/\|f_1\| = 0.553$ |
| $a_4 = -0.25031 \times 10^{-5}$ | $\|f_1\|/f_L = 1.015$ |
| $a_6 = -0.39697 \times 10^{-10}$ | $m_3 = 1.056$ |
| $a_8 = 0.33988 \times 10^{-12}$ | $\overline{N_{1n}} = 1.803$ |
| $a_{10} = -0.46099 \times 10^{-14}$ | $\overline{N_{2p}} = 1.773$ | where $F_{NO}$ signifies an F number, f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

10. A zoom lens system according to claim 1, further satisfying the following chart:

$F_{NO} = 1:2.8~3.2~3.6$
$f = 36.20~50.00~68.00$
$w = 31.8~23.3~17.4$  $f_B = 37.00$

| Surface No. | r | d | n | v |
|---|---|---|---|---|
| 1 | 63.008 | 2.00 | 1.83400 | 37.2 |

-continued

| | | | | |
|---|---|---|---|---|
| 2 | 25.021 | 8.47 | | |
| 3 | 657.128 | 0.20 | 1.58921 | 41.1 |
| 4 | 657.128 | 1.90 | 1.77250 | 49.6 |
| 5 | 82.683 | 0.10 | | |
| 6 | 35.270 | 5.07 | 1.80518 | 25.4 |
| 7 | 80.294 | 40.56~17.80~2.00 | | |
| 8 | 33.498 | 3.91 | 1.77250 | 49.6 |
| 9 | −380.690 | 2.70 | | |
| 10 | 25.346 | 3.44 | 1.77250 | 49.6 |
| 11 | 107.426 | 0.96 | | |
| 12 | −171.983 | 6.86 | 1.80518 | 25.4 |
| 13 | 17.562 | 4.49 | | |
| 14 | 155.604 | 2.61 | 1.58144 | 40.7 |
| 15 | −37.313 | 1.30~8.32~17.48 | | |
| 16 | −98.218 | 1.81 | 1.67270 | 32.1 |
| 17 | −55.574 | 1.50 | 1.69680 | 55.5 |
| 18 | −135.135 | | | |

Aspherical 3rd Surface

| | |
|---|---|
| K = 0.0 | $f_2/|f_1| = 0.555$ |
| $a_4 = -0.10867 \times 10^{-5}$ | $|f_1|/f_L = 1.033$ |
| $a_6 = 0.38254 \times 10^{-8}$ | $m_3 = 1.090$ |
| $a_8 = -0.75690 \times 10^{-11}$ | $\overline{N_{1n}} = 1.803$ |
| $a_{10} = 0.11202 \times 10^{-13}$ | $\overline{N_{2p}} = 1.773$ | where $F_{NO}$ signifies an F number, f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

11. A zoom lens system according to claim 1, further satisfying the following chart:

$F_{NO} = 1:2.8\sim3.2\sim3.6$
$f = 36.20\sim50.00\sim68.00$
$w = 32.0\sim23.3\sim17.3 \quad f_B = 37.80$

| Surface No. | r | d | n | v |
|---|---|---|---|---|
| 1 | 89.074 | 2.00 | 1.79952 | 42.2 |
| 2 | 26.111 | 8.17 | | |
| 3 | 569.990 | 1.90 | 1.77250 | 49.6 |
| 4 | 121.960 | 0.10 | | |
| 5 | 35.687 | 4.73 | 1.80518 | 25.4 |
| 6 | 68.451 | 0.20 | 1.58921 | 41.1 |
| 7 | 68.451 | 41.88~18.34~2.00 | | |
| 8 | 34.351 | 3.87 | 1.77250 | 49.6 |
| 9 | −405.893 | 2.70 | | |
| 10 | 26.060 | 3.47 | 1.77250 | 49.6 |
| 11 | 120.217 | 0.91 | | |
| 12 | −142.298 | 7.00 | 1.80518 | 25.4 |
| 13 | 18.320 | 4.78 | | |
| 14 | 136.211 | 2.84 | 1.58144 | 40.7 |
| 15 | −34.654 | 1.10~7.83~16.61 | | |
| 16 | 207.252 | 1.92 | 1.67270 | 32.1 |
| 17 | −224.694 | 0.0 | | |
| 18 | −224.694 | 1.50 | 1.69680 | 55.5 |
| 19 | 95.103 | | | |

Aspherical 7th Surface

| | |
|---|---|
| K = 0.0 | $f_2/|f_1| = 0.560$ |
| $a_4 = 0.81081 \times 10^{-6}$ | $|f_1|/f_L = 1.017$ |
| $a_6 = -0.40136 \times 10^{-8}$ | $m_3 = 1.150$ |
| $a_8 = 0.28045 \times 10^{-11}$ | $\overline{N_{1n}} = 1.786$ |
| $a_{10} = 0.0$ | $\overline{N_{2p}} = 1.773$ | where $F_{NO}$ signifies an F number, f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

12. A zoom lens system according to claim 1, further satisfying the following chart:

$F_{NO} = 1:2.8$
$f = 36.20\sim50.00\sim68.00$
$w = 32.1\sim23.4\sim17.5 \quad f_B = 37.80$

| Surface No. | r | d | n | v |
|---|---|---|---|---|
| 1 | 69.146 | 2.00 | 1.79952 | 42.2 |
| 2 | 25.460 | 8.87 | | |
| 3 | 7165.208 | 1.90 | 1.77250 | 49.6 |
| 4 | 129.006 | 0.35 | | |
| 5 | 36.743 | 4.33 | 1.80518 | 25.4 |
| 6 | 66.512 | 0.20 | 1.58921 | 41.1 |
| 7 | 66.512 | 39.69~17.45~2.00 | | |
| 8 | 38.773 | 4.92 | 1.77250 | 49.6 |
| 9 | −364.554 | 2.70 | | |
| 10 | 25.742 | 4.91 | 1.77250 | 49.6 |
| 11 | 178.517 | 1.19 | | |
| 12 | −154.655 | 5.30 | 1.80518 | 25.4 |
| 13 | 18.497 | 5.83 | | |
| 14 | 215.167 | 3.37 | 1.58144 | 40.7 |
| 15 | −36.431 | 1.10~8.73~18.67 | | |
| 16 | −71.605 | 1.66 | 1.60342 | 38.0 |
| 17 | −49.094 | 0.0 | | |
| 18 | −49.094 | 1.50 | 1.69680 | 55.5 |
| 19 | −79.102 | | | |

Aspherical 7th Surface

| | |
|---|---|
| K = 0.0 | $f_2/|f_1| = 0.591$ |
| $a_4 = 0.51170 \times 10^{-6}$ | $|f_1|/f_L = 1.999$ |
| $a_6 = -0.26068 \times 10^{-8}$ | $m_3 = 1.070$ |
| $a_8 = 0.56946 \times 10^{-12}$ | $\overline{N_{1n}} = 1.786$ |
| $a_{10} = 0.0$ | $\overline{N_{2p}} = 1.773$ | where $F_{NO}$ signifies an F number f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

13. A zoom lens system according to claim 1, further satisfying the following chart:

$F_{NO} = 1:2.8\sim3.2\sim3.6$
$f = 36.20\sim50.00\sim68.00$
$w = 32.0\sim23.4\sim17.4 \quad f_B = 37.80$

| Surface No. | r | d | n | v |
|---|---|---|---|---|
| 1 | 119.151 | 2.00 | 1.79952 | 42.2 |
| 2 | 25.366 | 7.14 | | |
| 3 | 129.090 | 1.90 | 1.77250 | 49.6 |
| 4 | 92.893 | 0.10 | | |
| 5 | 38.489 | 4.65 | 1.80518 | 25.4 |
| 6 | 83.341 | 0.20 | 1.58921 | 41.1 |
| 7 | 83.341 | 40.44~17.75~2.00 | | |
| 8 | 33.808 | 3.93 | 1.77250 | 49.6 |
| 9 | −401.330 | 2.70 | | |
| 10 | 26.422 | 3.46 | 1.77250 | 49.6 |
| 11 | 125.719 | 0.87 | | |
| 12 | −150.833 | 7.00 | 1.80518 | 25.4 |
| 13 | 18.279 | 4.11 | | |
| 14 | 309.005 | 2.59 | 1.58144 | 40.7 |
| 15 | −35.631 | 1.10~8.54~18.24 | | |
| 16 | −131.276 | 1.81 | 1.71736 | 29.5 |
| 17 | −69.939 | 0.50 | | |
| 18 | −48.221 | 1.50 | 1.69680 | 55.5 |
| 19 | −81.622 | | | |

Aspherical 7th Surface

| | |
|---|---|
| K = 0.0 | $f_2/|f_1| = 0.566$ |
| $a_4 = -0.15414 \times 10^{-5}$ | $|f_1|/f_L = 1.041$ |
| $a_6 = -0.39349 \times 10^{-8}$ | $m_3 = 1.050$ |
| $a_8 = -0.18128 \times 10^{-11}$ | $\overline{N_{1n}} = 1.786$ |
| $a_{10} = 0.0$ | $\overline{N_{2p}} = 1.773$ | where $F_{NO}$ signifies an F number, f designates a focal length, w designates a half view angle, $f_B$ designates a back focus, r is the radius of curvature of an individual lens surface, d designates a lens thickness or the aerial distance between lenses, N is the refractive index at the d-line of an individual lens element, and v is the Abbe number of an individual lens element.

* * * * *